United States Patent [19]
Meyers

[11] 3,754,793
[45] Aug. 28, 1973

[54] SPRING BRAKE CONTROL VALVE
[75] Inventor: Robert E. Meyers, South Bend, Ind.
[73] Assignee: The Bendix Corporation, South Bend, Ind.
[22] Filed: Dec. 3, 1971
[21] Appl. No.: 204,569

[52] U.S. Cl. .................................. 303/13, 303/9
[51] Int. Cl. ............................................ B60t 13/22
[58] Field of Search .................. 188/170; 303/9, 13, 303/29

[56] References Cited
UNITED STATES PATENTS
3,463,276 8/1969 Brooks .......................... 303/13 X
3,617,097 11/1971 Grabb ............................ 303/9 X Primary Examiner—Duane A. Reger
Attorney—Ken C. Decker et al.

[57] ABSTRACT

A spring brake control valve is disclosed which is used in a vehicular hydraulic system for developing pressure to release the vehicle's spring-applied emergency and parking brake. The valve includes a housing having an inlet and outlet connected to the vehicle's hydraulic system and a chamber communicated to the spring brake release mechanism. Valve means within the housing normally permits uninhibited flow of fluid between the inlet and outlet, but is movable to a position restricting fluid flow between the inlet and outlet to develop back pressure in the hydraulic system to develop pressure in the chamber communicated to the spring brake release mechanism with a fluid at a predetermined pressure level. The valve means is movable to yet another position to release the fluid pressure communicated to the release mechanism when the vehicle is parked.

18 Claims, 4 Drawing Figures

INVENTOR.
ROBERT E. MEYERS
BY
*Ken C. Decker*
ATTORNEY

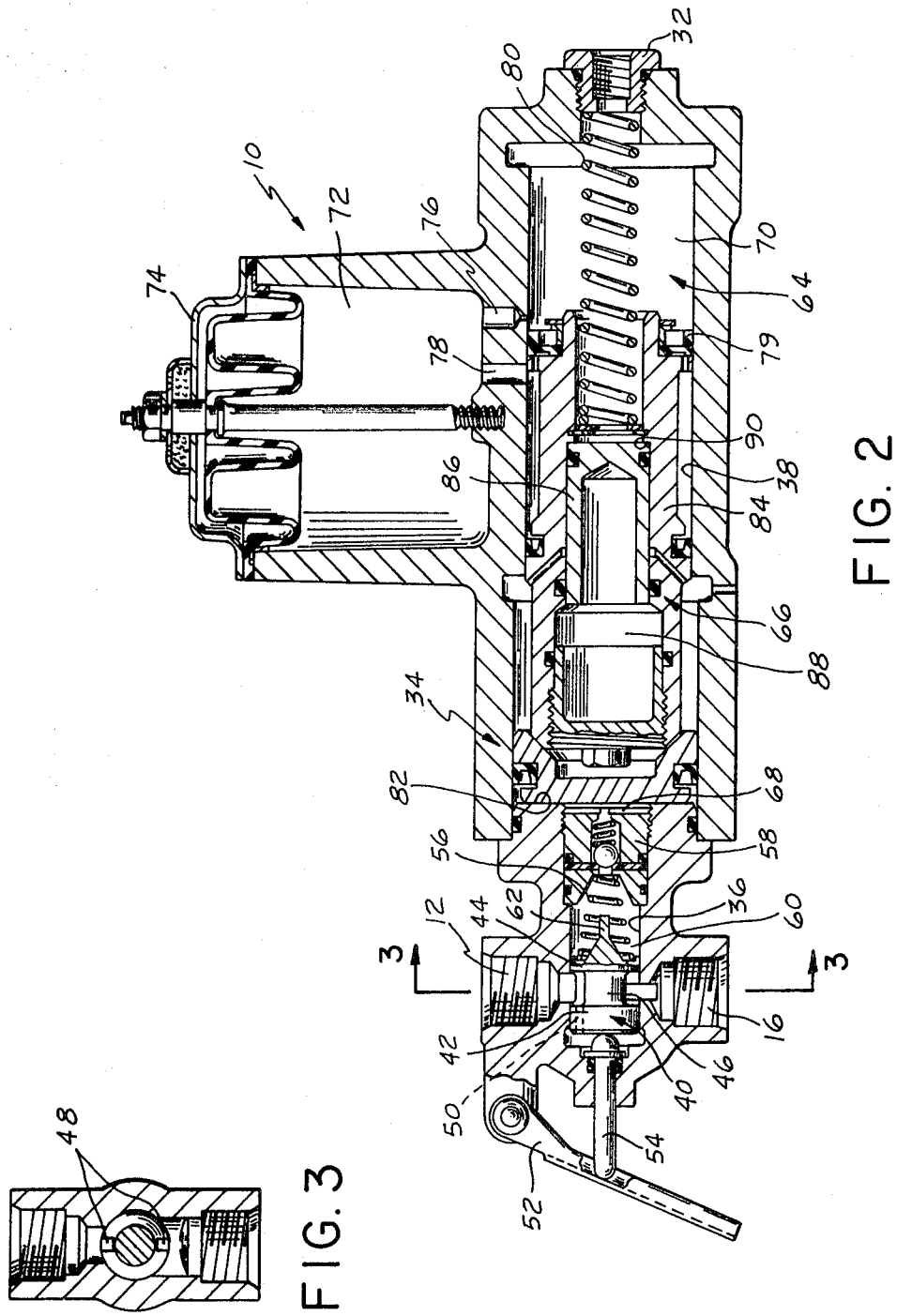

3,754,793

SPRING BRAKE CONTROL VALVE

BACKGROUND OF THE INVENTION

For safety reasons, spring-applied emergency and parking brakes have become increasingly popular for use on commercial vehicles. These brakes include a spring actuator which automatically applies the brakes should a malfunction result in loss of braking pressure in the vehicle's hydraulic system. Furthermore, the spring actuator is applied when the vehicle is parked to prevent movement of the latter until the vehicle's engine is started and a sufficient hydraulic pressure is developed in the hydraulic system. In order to control the spring actuator, it is necessary to provide a valve within the vehicle's hydraulic system that is capable of developing sufficient pressure after the vehicle's engine is started to release the spring brakes. The spring brake actuator may be of any well-known type, such as the actuator disclosed in U.S. Pat. No. 3,613,839, owned by the assignee of the present invention and incorporated herein by reference.

SUMMARY OF THE INVENTION

Therefore, an important object of my invention is to provide a control valve for use in a vehicle hydraulic system which is capable of developing sufficient pressure to release the spring brakes when the vehicle engine is started.

Another important object of my invention is to provide a control valve which may be operated by the operator of the vehicle to charge the spring brake release mechanism when the vehicle is started, and to release fluid pressure from the release mechanism to permit the spring actuator to apply the spring brake when the vehicle is parked.

Another important object of my invention is to provide pressure compensating means in a spring brake control valve so that a substantially constant hold-off pressure is delivered to the spring brake release mechanism regardless of an increase in the ambient temperature in which the vehicle operates.

Still another object of my invention is to provide a spring brake control valve which does not detrimentally affect the operation of the other fluid devices in the vehicle's hydraulic system.

DESCRIPTION OF THE DRAWINGS

FIG. 2 is a longitudinal cross-sectional view of a spring brake control valve made pursuant to the teachings of my present invention;

FIG. 3 is a cross-sectional view taken along lines 3—3 of FIG. 2; and

DETAILED DESCRIPTION

Figure 1:
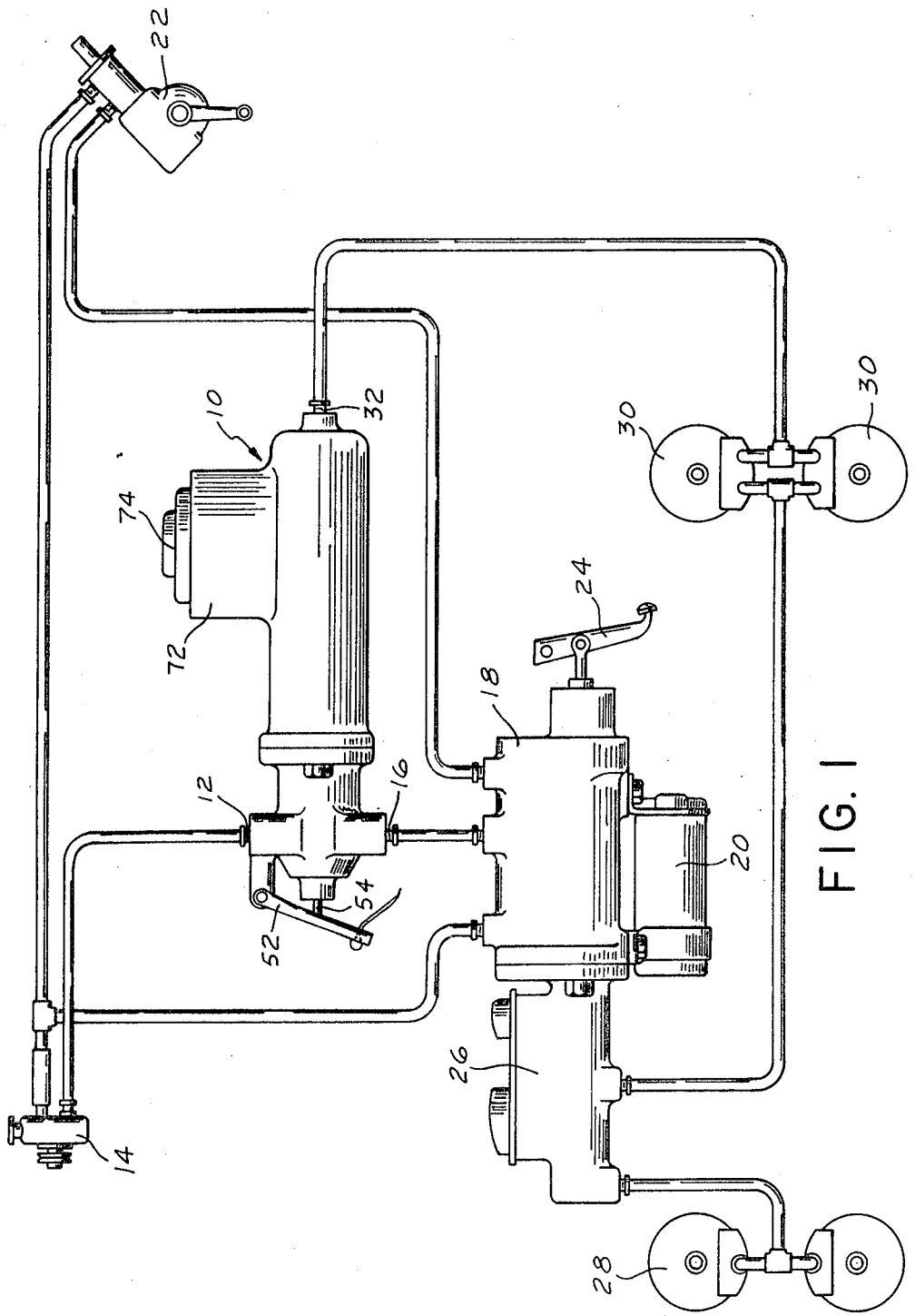
FIG. 1 is a schematic illustration of a vehicle hydraulic braking system having a spring brake control valve made pursuant to the teachings of my present invention.

Referring now to FIGS. 1-3 of the drawings, a spring brake control valve generally indicated by the numeral 10 includes an inlet port 12 communicated to the outlet or high pressure side of the vehicle's power steering pump 14 and an outlet port 16 which is communicated to the inlet of the vehicle's hydraulic brake booster 18. The hydraulic brake booster may be of any suitable type well known to those skilled in the art, but is preferably made pursuant to the teachings of U.S. Pat. No. 3,603,209, owned by the assignee of the present invention incorporated herein by reference. An electric motor pump 20 is provided to provide an emergency fluid power source to the brake booster 18 should the vehicle power steering pump 14 malfunction. The outlet port of the booster 18 is communicated to the inlet of the vehicle's power steering gear 22. The outlet of the power steering gear 22, and the return or exhaust port of the brake booster 18, are both communicated to the inlet or low pressure side of the power steering pump 14.

Operation of the conventional foot pedal 24 mounted in the vehicle operator's compartment to actuate the brake booster 18 develops braking pressure in a conventional automotive master cylinder 26 actuated by the booster 18 in the normal manner. The outlet ports of the master cylinder 26 are communicated to the service brake actuators on the vehicle's front wheel brakes 28 and rear wheel brakes 30, respectively. The vehicle's rear wheel brakes are also equipped with spring actuators, as disclosed in the aforementioned U.S. Pat. No. 3,613,839, and the fluid actuated spring brake hold-off mechanism of the rear wheel brakes is communicated to a second outlet port 32 on the control valve 10.

Spring brake control valve 10 includes a housing 34 defining a first bore 36 and a second bore 38 therewithin. A spool valve generally indicated by the numeral 40 is slidable in the bore 36 and includes lands 42, 44 separated by a groove 46. Openings 48 extend through the land 44, and a drilled passage 50 extends through the land 42. The spool valve 40 is actuated by a hinged lever 52 mounted in the vehicle operator's compartment which moves a plunger 54 extending through the end of the bore 36 which engages one end of the spool valve 40. A spring 56 yieldably urges the spool valve 40 to the left viewing FIG. 2. It will be noted that the ports 12 and 16 are disposed on substantially the same transverse plane of the bore 36. However, the opening of the inlet 12 extends axially along the bore 36 for a substantially greater distance than does the opening of the outlet 16.

A check valve 58 is also mounted in the bore 36. One end of the check valve 58 cooperates with the corresponding end of the spool valve 40 to define a fluid receiving cavity 60 therebetween. A projection 62 extends from the corresponding end of the spool valve 40 and is adapted to open the check valve 58 when the spool valve 40 is shifted a sufficient distance, as will be described in detail later herein.

The other end of the check valve 58 defines one end of a chamber 64 within the bore 38. A retractable piston generally indicated by the numeral 66 divides the chamber 64 into a first compartment 68 between one end of the piston 66 and the corresponding end of the check valve 58 and another compartment 70 between the other end of the piston 66 and the opposite end of the housing 34. The outlet 32 communicates the compartment 70 with the spring brake release mechanism, as described hereinabove. Housing 10 further includes brake fluid receiving reservoir 72 closed by a cover member 74. Compensating port 76 and fill port 78 communicate reservoir 72 with the chamber 64 in a manner identical to that of a standard automotive master cylinder, which is well known to those skilled in the art. It will be noted that when the piston 66 moves to the right for sufficient distance, annular seal 79 carried on one end of the piston 66 will close the port 76 such that the fluid contained in the compartment 70 is a closed volume which may be pressurized by further movement of the piston 66 to the right, viewing FIG. 2. A return spring 80 yieldably urges the piston 66 to the left, viewing FIG. 2, into engagement with the shoulder 82 defined on the housing 34.

The piston 66 includes an outer member 84 which slidably receives an inner member 86, which cooperates with the outer member 84 to define a volume 88 therebetween. The volume 88 is charged with a deformable medium, such as compressed gas, when the spring brake control valve 10 is assembled at the factory. The compressed gas and the volume 88 yieldably urges the inner piston 86 into engagement with a shoulder 90 on the outer piston 84.

MODE OF OPERATION OF THE PREFERRED EMBODIMENT

When the vehicle is parked with the spring brakes applied, the operator starts the vehicle's engine to actuate the power steering pump 14, which circulates fluid in the vehicle's hydraulic system. To release the spring brakes, the operator moves the plunger 54 inwardly, thereby shifting the spool valve 40 to the right viewing FIG. 2, to dispose the land 42 in the transverse plane of the bore 36 common to the inlet port 12 and the outlet port 16. The axial length of the land 42 is sufficiently long that it completely covers the outlet port 16 communication into the bore 36, although some leakage around the land 42 does exist to provide some flow to the system. Therefore, back pressure is developed in the hydraulic system since the outlet port 16 is blocked, so that the pressure level at the inlet port 12 is increased. Since the axial length of the communication between the inlet port 12 and the bore 36 is longer than the axial length of the land 42, high pressure fluid is communicated into the cavity 60 through openings 48 in the land 44. Fluid in the cavity 60 freely flows past the check valve 58 into the compartment 68, where it acts against the left-hand end of the piston 66, urging the latter to the right viewing FIG. 2, to cause the seal 79 to terminate communication through the compensating port 76. A further increase in fluid pressure in the compartment 68 shifts the piston 66 further to the right viewing FIG. 2, thereby developing fluid pressure in the compartment 70 which is communicated to the spring brake release mechanism, to release the spring actuators. Although fluid may freely flow from the cavity 60 past the check valve 58 into the compartment 68, flow of fluid in the reverse direction is prevented by the check valve 58. Fluid remains trapped in the compartment 68, and therefore a high fluid pressure is maintained in the compartment 70 to maintain the spring actuators in a released condition so that the vehicle may be moved. When a sufficient fluid pressure level is achieved in the compartment 70 to release the spring brakes, the operator releases the lever 52, thereby permitting the spring 56 to return the spool valve 40 to the position illustrated in FIG. 2. However, as pointed out hereinabove, fluid remains trapped in the compartment 68 by the check valve 58.

When the vehicle is parked, and the spring brakes are to be applied, the vehicle operator moves the plunger 54 as far to the right as possible. Movement of the plunger 54 forces the spool valve 40 an additional distance past the position in which the land 42 is disposed in the common transverse plane of the inlet and outlets 12 and 16. As the land 42 is shifted past this plane, free flow of fluid is again permitted between the inlet and outlets 12 and 16. Furthermore, the projection 62 carried by the spool valve 40 engages the check valve 58, to open the latter, thereby permitting fluid to escape from the compartment 68 into the cavity 60. Fluid escapes from the cavity 60 to the outlet port 16 through the openings 48 in the land 44, past the groove 46, and through the drilled opening 50 in the land 42.

As described hereinabove, fluid remains trapped in the compartment 70 and in the spring brake release mechanism during normal operation of the vehicle. However, the ambient temperature in which the vehicle operates during a normal day may vary over a considerable range, causing the fluid trapped in the control valve 10 and in the spring brake release mechanism to expand or contract a considerable amount. For example, if the ambient temperature increases, the fluid pressure in the compartment 70 may increase to such an extent that the control valve 10, the spring brake release mechanism, or the brake line may be damaged. If the vehicle should be driven into an area having a lower ambient temperature, the fluid volume may be considerably reduced, thereby causing the brake lining of the brake 30 to "drag", damaging the latter. To compensate for an increase in ambient temperature, the gas charge in the volume 88 is regulated at the factory so that the inner piston 86 is moved away from the shoulder 90 by fluid pressure in the compartment 70 at a pressure just above that required to release the spring brakes. Therefore, if the fluid in the compartment expands, the piston 86 moves further to the left, thereby enlarging the volume of the compartment 70 and reducing the fluid pressure level therein to prevent damage to the hydraulic system. Conversely, if the fluid pressure level in the compartment 70 decreases, a warning device in the operator's compartment informs the operator of the low pressure level. The operator then actuates the lever 52 to increase the pressure level in compartment 70.

DETAILED DESCRIPTION OF THE ALTERNATE EMBODIMENT

Figure 4:
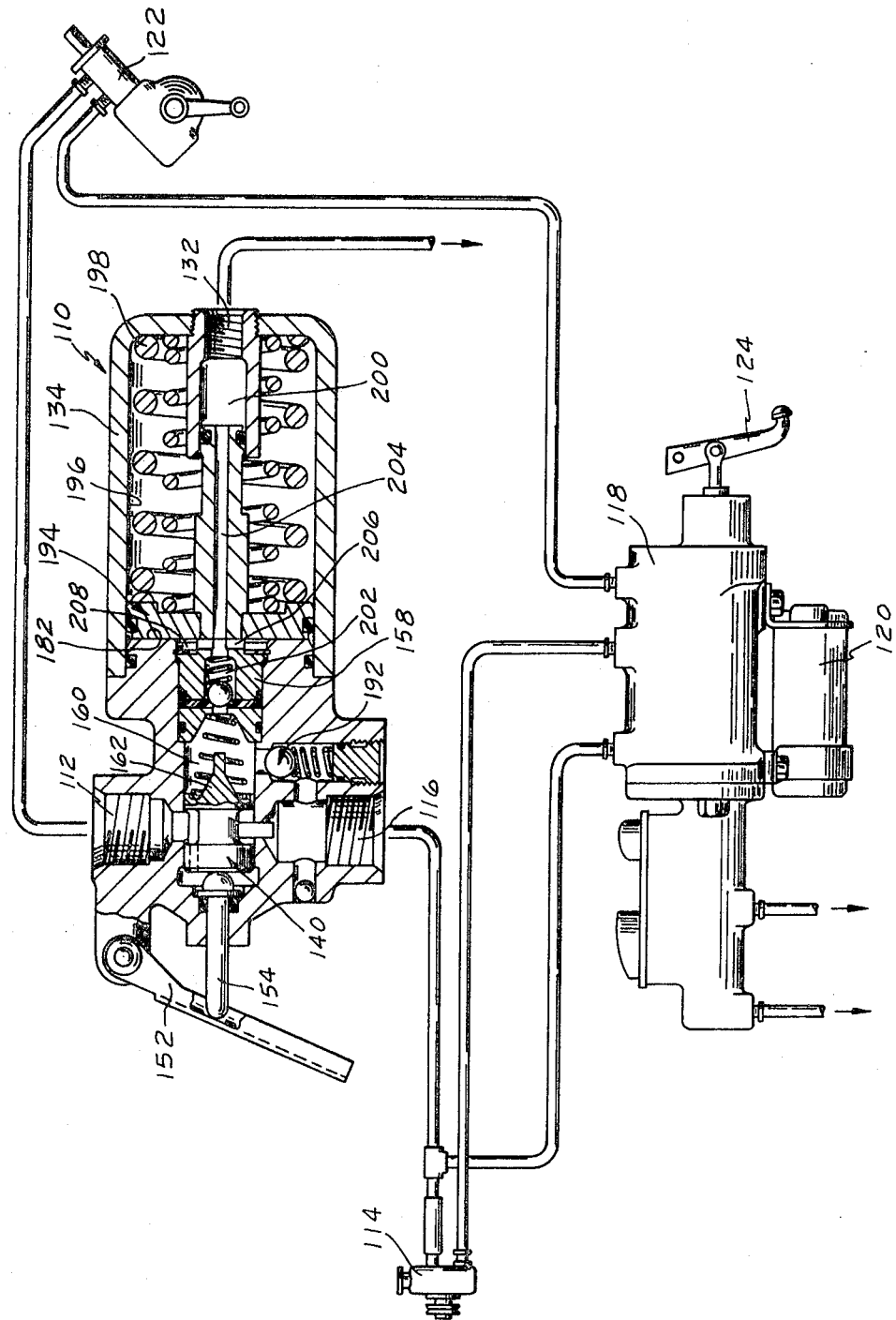
FIG. 4 is a schematic illustration of a vehicle hydraulic braking system with a spring brake control valve made pursuant to the teachings of another embodiment of my invention illustrated in cross section.

Referring now to the embodiment of FIG. 4, elements substantially the same as those in the preferred embodiment retain the same reference character, but are increased by 100. In FIG. 4, the control valve 110 includes inlet and outlet ports 112 and 116, respectively, which are connected in the return line communicating the outlet of the steering gear 122 to the inlet or low pressure side of the pump 114. The valve 140, check valve 158 and associated control mechanism 152 and 154 are identical to the corresponding elements in the preferred embodiment and will not be described in detail. However, a relief valve generally indicated by the numeral 192 is provided between the fluid cavity 160 and the outlet port 116 such that the fluid pressure level in the cavity 160 is limited to a predetermined maximum amount. A piston generally indicated by the numeral 194 is slidably mounted in a bore 196 defined within the housing 134. Springs 198 yieldably maintain the piston 194 in engagement with a shoulder 182 on the housing 134. The port 132 communicates with the spring brake release mechanism and a chamber 200 within the housing 134, and is also communicated with a compartment 202 to the right of check valve 158 by a passage 204 extending through the piston 194. Passage means 206 communicates the compartment 202 with a chamber 208 defined between the left-hand face of the piston 194 and the shoulder 182 of the housing 134. The spring brake release mechanism is charged in substantially the same way in the embodiment of FIG. 4 as in the preferred embodiment. However, fluid pressure developed in chamber 208 is communicated directly to the spring brake release mechanism through passage 204 and chamber 200, there being no intermediate piston as in the preferred embodiment. Should an increase in the ambient fluid temperature cause the volume of fluid in the spring brake release mechanism and the chamber 200 to increase, the piston 194 will be urged to the right against the force of the springs 198, because the chamber 200 is communicated to the chamber 208 by passages 204 and 206. As the piston 194 moves to the right viewing FIG. 4, the effective volume of the chamber 200 is increased, thereby reducing the fluid pressure level in this chamber and in the spring brake release mechanism so that damage to the system is prevented.

It should be noted that the mechanism illustrated in the FIG. 4 embodiment requires only a single fluid, while the preferred embodiment requires two different fluids. However, the fluid pressure level developed in the compartment 70 in the preferred embodiment may be substantially greater than the fluid pressure developed in the compartment 68, since the face of the piston 66 exposed to the fluid pressure level in the compartment 68 may be made substantially larger than is the face of the piston exposed to the fluid pressure level in the compartment 70 so that a pressure multiplying effect is achieved. However, no such pressure multiplying effect is possible with the embodiment and FIG. 4, restricting its use to spring brake release mechanisms that require a relatively low pressure to be released.

I claim:
1. In a hydraulic device:
a housing having an inlet and an outlet;
a chamber defined within said housing;
manually operable valve means slidable in said housing from a first position permitting substantially uninhibited fluid communication between the inlet and outlet to a second position restricting fluid communication between the inlet and outlet to increase the fluid pressure level at the inlet and permitting communication of the increased fluid pressure level at the inlet into said chamber;
check valve means permitting fluid communication into said chamber, but normally preventing fluid communication from said chamber; and
other means within said housing for opening said check valve means to exhaust fluid pressure from said chamber to said outlet port.
2. The invention of claim 1:
said other means being a member projecting from one end of said valve means, said valve means being shiftable past said second position to a third position in which said member opens said check valve.
3. The invention of claim 1:
said valve means being a spool valve having a land and a groove, said groove being disposed between said inlet and outlet when said valve means is disposed in said first position, said land being disposed in a position restricting communication between said inlet and outlet when said valve means is disposed in said second position.
4. The invention of claim 3; and
a bore defined within said housing slidably receiving said spool valve, said inlet and outlet being disposed in a substantially common transverse plane of said bore, said inlet extending axially along said bore for a greater distance than said outlet, whereby said land closes said outlet port when said valve means is disposed in said second position and fluid flows from said inlet port around said land into said chamber.
5. The invention of claim 4; and
resilient means yieldably urging said valve means toward said first position.
6. The invention of claim 2:
said valve means being a spool valve having a land and a groove, said groove being disposed between said inlet and outlet when said valve means is disposed in said first position, said land being disposed in a position restricting flow of fluid between the inlet and outlet when said valve means is disposed in said second position, said valve means in said third position again permitting substantially uninhibited fluid communication between the inlet and outlet.
7. The invention of claim 6; and
a bore defined within said housing slidably receiving said spool valve, said inlet and outlet being disposed in a substantially common transverse plane of said bore, said land being disposed in a first position on one side of said transverse plane when the valve means is disposed in the first position, said land being moved into said transverse plane when the valve means is disposed in said second position, said land being moved past said transverse plane to permit substantially uninhibited fluid communication between the inlet and outlet when said valve means is disposed in said third position.
8. The invention of claim 7; and
passage means extending through said land to permit communication between said chamber and said outlet post when the valve means is disposed in said third position.
9. The invention of claim 1; and
a second outlet communicating with said chamber; and pressure responsive means maintaining a substantially constant pressure level at said second outlet after said valve means is moved from said second position after charging said chamber with pressurized fluid.
10. The invention of claim 9:
said pressure responsive means including a retractable piston slidably mounted within said housing and dividing said chamber into a first compartment between one end of said piston and said check valve means and another compartment between the other end of said piston and said second outlet;
reservoir means communicating fluid into said another compartment;
said piston being responsive to fluid pressure in said first compartment to slide toward the opposite end of the housing to first terminate fluid communication between the reservoir and the another compartment and thereafter establishing a predetermined pressure level in said another compartment proportional to the fluid pressure level in said first compartment;

said piston retracting to thereby enlarge said another compartment to reduce the fluid pressure level therein if said fluid pressure level in said another compartment exceeds said predetermined level.

11. The invention of claim 10:

said piston including an outer member, an inner member slidably mounted in said outer member and cooperating with the latter to define a volume therebetween, said volume containing a medium exerting a predetermined force on said inner member yieldably urging the latter into engagement with stop means carried by said outer member.

12. The invention of claim 9:

said pressure responsive means including a piston slidable in said housing and cooperating with the latter to define a compartment therebetween, and a deformable medium yieldably urging said piston toward the housing; and conduit means communicating said chamber to said compartment, whereby increasing fluid pressure in said chamber yieldably urges said piston away from said housing to increase the effective volume of said chamber thereby relieving the fluid pressure level in the chamber.

13. The invention of claim 12:

said deformable medium being a coiled spring.

14. The invention of claim 1; and a compartment defined between one end of said manually operable valve means and said check valve means; and a relief valve communicating said compartment with the outlet when the fluid pressure level in said compartment attains a predetermined level.

15. In a vehicle hydraulic braking system including spring actuated emergency brakes, a hydraulic device for developing pressure to release said spring actuated emergency brakes comprising:

a housing having an inlet, an outlet, and a chamber, the fluid pressure level in said chamber being communicated to said spring actuated emergency brakes for releasing the latter;

valve means in said housing movable to a position restricting flow between the inlet and outlet to develop back pressure in the hydraulic system to charge said chamber to a predetermined pressure level sufficient to release said spring actuated emergency brakes, the pressure level in said chamber being releasable to permit said spring actuated emergency brakes to be applied;

pressure responsive means maintaining a substantially constant pressure level in said chamber after the latter is charged with fluid until the pressure level in the chamber is released;

said pressure responsive means including a retractable piston slidably mounted within said chamber and dividing the latter into first and second compartments between opposite ends of the piston and corresponding walls of the housing;

said valve means communicating pressurized fluid into said first compartment upon movement of the valve means to said position restricting flow of fluid between the inlet and outlet; and reservoir means communicating fluid into said second compartment;

said second compartment being communicated to said spring actuated emergency brakes;

said piston being responsive to the fluid pressure in said first compartment to slide toward the second compartment to first terminate fluid communication between the resevoir and the second compartment and thereafter establishing a predetermined pressure level in said second compartment proportional to the fluid pressure level in said first compartment;

said piston retracting to thereby enlarge said second compartment to reduce the fluid pressure level therein if said fluid in said second compartment exceeds said predetermined level.

16. The invention of claim 15:

said piston including an outer member and an inner member slidably mounted in said outer member and coooperating with the latter to define a volume therebetween, said volume containing a medium exerting a predetermined force on said inner member yieldably urging the latter into engagement with stop means carried by said outer member.

17. In a vehicle hydraulic braking system including spring actuated emergency brakes, a hydraulic device for developing pressure to release said spring actuated emergency brakes comprising:

a housing having an inlet, an outlet, and a chamber, the fluid pressure level in said chamber being communicated to said spring actuated emergency brakes for releasing the latter;

valve means in said housing movable in a position restricting flow between the inlet and outlet to develop back pressure in the hydraulic system to charge said chamber to a predetermined pressure level sufficient to release said spring actuated emergency brakes to be applied;

pressure responsive means maintaining a substantially constant pressure level in said chamber after the latter is charged with fluid until the pressure level in the chamber is released;

said pressure responsive means including a piston slidable in said housing and cooperating with the latter to define a compartment therebetween, and a deformable medium yieldably urging said piston toward the housing; and conduit means communicating said chamber to said compartment, whereby increasing fluid pressure in said chamber in excess of a predetermined amount yieldably urges said piston away from said housing to increase the effective volume of said chamber, thereby relieving the fluid pressure level in the chamber.

18. The invention of claim 17:

said deformable medium being a coiled spring.

* * * * *